J. A. WEEKS.
COMBINED PLOW AND CULTIVATOR.
APPLICATION FILED FEB. 15, 1913.
1,109,095.
Patented Sept. 1, 1914.
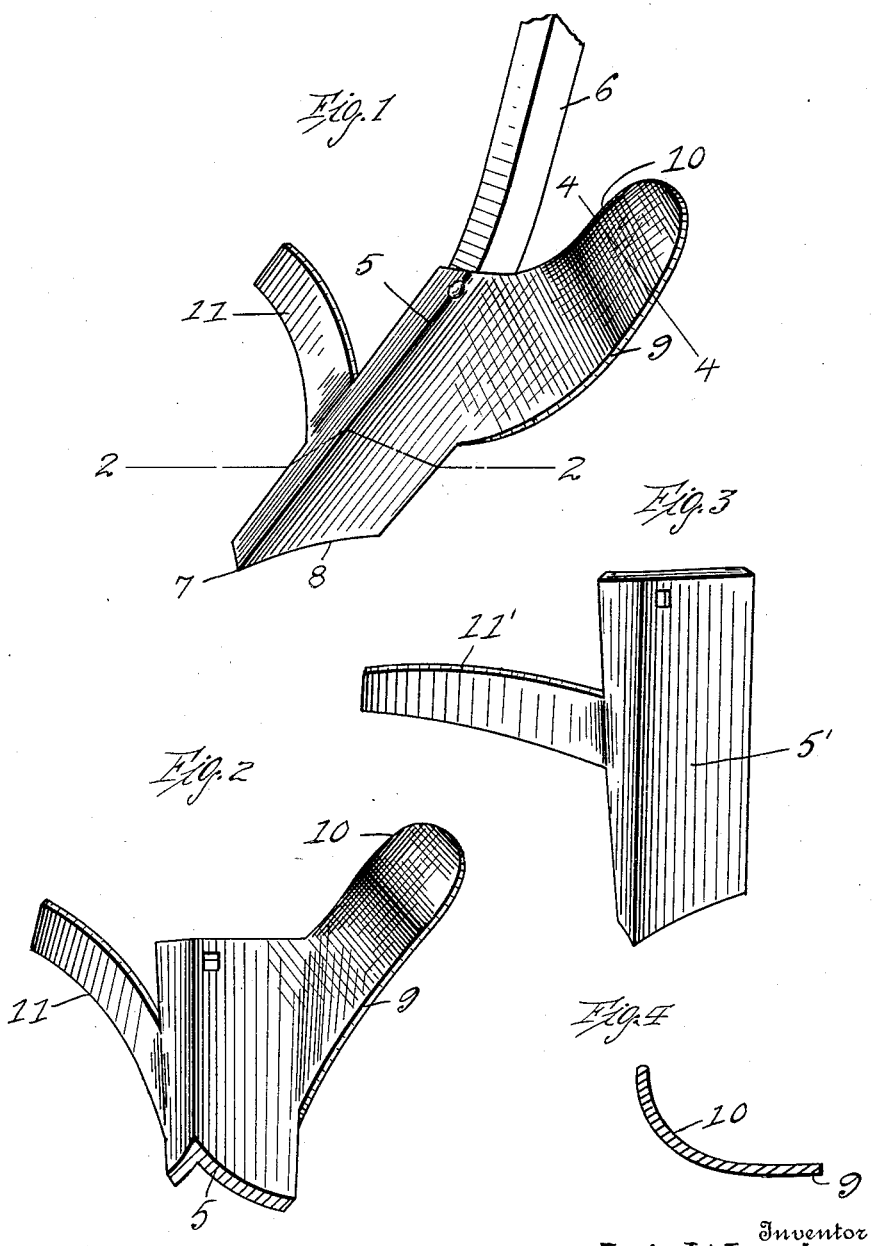

UNITED STATES PATENT OFFICE.

JOHN A. WEEKS, OF GANER, ALABAMA.

COMBINED PLOW AND CULTIVATOR.

1,109,095. Specification of Letters Patent. Patented Sept. 1, 1914.

Application filed February 15, 1913. Serial No. 748,759.

*To all whom it may concern:*

Be it known that I, JOHN A. WEEKS, a citizen of the United States, residing at Ganer, in the county of Geneva and State of Alabama, have invented certain new and useful Improvements in Combined Plows and Cultivators, of which the following is a specification, reference being had to the accompanying drawings.

This invention relates to a combined plow and cultivator and has for its primary object to provide a plow blade consisting of a single rolled metal plate provided upon one of its longitudinal edges with a mold board, to turn the earth from the furrow and having formed upon its other longitudinal edge an obliquely inclined wing or scraping blade to direct the loose upper soil to the base of the plate stalks.

Another object of the invention resides in the provision of an improved combination plow and cultivator blade adapted to travel upon the left hand side of the plant row and plow a furrow between adjacent rows to thoroughly loosen the soil so that it will more readily absorb moisture, and simultaneously direct a portion of the loosened soil to the base of the plant row.

Another object of the invention is to provide a device of the above character which is particularly designed for use in the cultivation of cotton, whereby the expense incident to the use of a separate plow and cultivator is avoided.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a perspective view of a combined plow and cultivator blade embodying the present invention, illustrating a form of the device which is particularly designed for use in the cultivation of cotton; Fig. 2 is a section taken on the line 2—2 of Fig. 1; Fig. 3 is a plan view showing a slightly modified form of the invention, adapted for use in the cultivation of corn; and Fig. 4 is a section taken on the line 4—4 of Fig. 1.

Referring in detail to the drawings, 5 designates a plow blade which is mounted at its upper end in any preferred manner upon the usual beam 6. The lower end of the point of the blade indicated at 7 is disposed adjacent to one of the longitudinal edges of the blade, the end edge of the blade being obliquely inclined as indicated at 8 from the point 7 to the opposite longitudinal edge thereof, to facilitate the movement of the plow point through the soil. Upon the upper end of the blade 5 and extending from the left hand longitudinal edge thereof, a mold board 9 is integrally formed, said mold board being disposed at an angle with relation to the longitudinal axis of the blade and extending above the upper end thereof. The inner edge portion 10 of the mold board which extends beyond the end of the plow blade is of concavo-convex form to prevent the earth over falling from the upper edge of the mold board.

Upon the other or right hand longitudinal edge of the plow blade 5 and approximately at the center thereof, an elongated flat wing 11 is formed. This wing it will be noted is obliquely inclined and extends rearwardly from the edge of the plow blade with its forward face in continuity with the outer face of the adjacent portion of the blade 5.

In the use of the device, the blade is properly arranged between the plant rows and as it is drawn between said rows, the plow point 7 enters the soil and directs the same rearwardly from the furrow upon the mold board 9 which turns the soil and deposits the same upon one side of the furrow. The loosened soil at the other side of the plow furrow is directed by the rearwardly inclined forward edge of the wing 11 to the right and upon the left hand side of one of the plant rows at the base of the plant stalks. It will thus be seen that the earth between the plant rows is thoroughly loosened or disturbed so that the same will readily absorb moisture and at the same time fresh earth is supplied at the base of the plant stalks.

In Fig. 3 of the drawings, I have shown a form of blade which may be employed in the cultivation of corn. In this form of the invention, the rearwardly and upwardly extending mold board 9 is eliminated, and the body 5′ of the blade is provided with the rearwardly inclined wing 11′ extending from the right hand longitudinal edge thereof. This wing directs the loosened soil upon the left hand side of the plant row at the base of the stalks in the same manner as above described in connection with the preferred form of the invention.

From the foregoing, it is believed that the construction and manner of use of my improved combination plow and cultivating blade will be clearly understood. The device is very simple in its construction, may be manufactured at small cost and eliminates the necessity of employing a separate plow and cultivator as at present required in the cultivation of cotton. The construction of the device places no additional draft upon the animals and owing to the integral form thereof, it will be obvious that the same is extremely strong, durable and efficient in practical use.

While I have shown and described the preferred construction of the invention, it will be understood that changes in the form, and proportion of the several parts may be resorted to without departing from the essential features or sacrificing any of the advantages thereof.

Having thus described the invention, what is claimed is:

A plow blade having longitudinal extending divergently related portions of relatively different widths presenting a longitudinal ridge, and a laterally directed longitudinally curved flat wing integrally formed with an intermediate portion of the longitudinal edge of the narrower portion of said blade and disposed substantially at right angles thereto, the forward face of such wing being in continuity with the outer face of the adjacent portion of the blade whereby the forward flat face of the wing is substantially vertically disposed.

In testimony whereof I hereunto affix my signature in the presence of two witnesses.

JOHN A. WEEKS.

Witnesses:
 JAMES A. WHALEY,
 A. A. WELCH.